(12) United States Patent
Hsu et al.

(10) Patent No.: US 12,736,760 B2
(45) Date of Patent: Sep. 15, 2026

(54) BIDIRECTIONAL WAFER-LEVEL LIGHT COUPLING

(71) Applicant: International Business Machines Corporation, Armonk, NY (US)

(72) Inventors: Hsianghan Hsu, Yokohama (JP); Qianwen Chen, Chappaqua, NY (US); Neng Liu, Albany, NY (US); John Knickerbocker, Monroe, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 18/539,375

(22) Filed: Dec. 14, 2023

(65) Prior Publication Data

US 2025/0199253 A1 Jun. 19, 2025

(51) Int. Cl.
*G02B 6/42* (2006.01)

(52) U.S. Cl.
CPC .................................. *G02B 6/4214* (2013.01)

(58) Field of Classification Search
CPC .................................................... G02B 6/4214
See application file for complete search history.

(56) References Cited

U.S. PATENT DOCUMENTS 10,514,509 B2 12/2019 Popovic et al.
11,119,280 B2 9/2021 Kuo et al.
11,137,544 B2 10/2021 Verslegers et al.
2014/0299751 A1* 10/2014 Tang ...................... B82Y 20/00 385/14
2017/0207600 A1 7/2017 Klamkin et al.
2020/0341191 A1* 10/2020 Meade .................. G01M 11/31
2022/0196915 A1 6/2022 Coons et al.
2024/0176068 A1* 5/2024 Li ........................... G02B 6/43
2024/0272366 A1* 8/2024 Chandran ................ G02B 6/30

FOREIGN PATENT DOCUMENTS

WO 2012112172 A1 8/2012

OTHER PUBLICATIONS

Kopp, et al, "Enhanced Fiber Grating Coupler Integrated by Wafer-to-Wafer Bonding", Journal of Lightwave Technology, vol. 29, No. 12, 2011, pp. 1847-1851.
Noriki, et al, "Optical TSV Using Si-Photonics Integrated Curved Micro-Mirror", International 3D Systems Integration Conference (3DIC), 2019, 4 pages.
Taheri, et al, "ReSiPI: A Reconfigurable Silicon-Photonic 2.5D Chiplet Network with PCMs for Energy-Efficient Interposer Communication" arXiv preprint, 2022, 9 pages.
Zhang, et al, "Simulation research of high-efficiency unidirectional vertical coupling grating couplers for optical through-silicon vias in 3D optoelectronic integrated circuits", Optics Communications, 2021, 5 pages.

* cited by examiner

*Primary Examiner* — Uyen Chau N Le
*Assistant Examiner* — Hoang Q Tran
(74) *Attorney, Agent, or Firm* — CANTOR COLBURN LLP; Samuel Waldbaum

(57) ABSTRACT

A semiconductor structure with bidirectional wafer-level light coupling is provided. In one embodiment, the semiconductor structure includes a bidirectional diffractive grating coupler, where the bidirectional diffractive grating coupler includes a first diffractive grating coupler, a planar waveguide, and a second diffractive grating coupler, a first optical through-silicon via cladding coupled to the first diffractive grating coupler, and a second optical through-silicon via cladding coupled to the first diffractive grating coupler.

20 Claims, 6 Drawing Sheets

BIDIRECTIONAL WAFER-LEVEL LIGHT COUPLING

BACKGROUND

The present disclosure relates to chip packaging, and more specifically, to bidirectional wafer-level light coupling using diffractive grating couplers (DGCs) and through-silicon vias (TSVs).

Traditional three-dimensional (3D) chip stacking involves vertically integrating multiple semiconductor layers or dies into a single semiconductor structure. TSVs are vertical interconnects between the semiconductor layers and dies that can be used to transfer electrical signals or optical signals. However, traditional 3D chip stacking generally uses unidirectional signal routing, which can impede efforts to minimize physical dimensions of the semiconductor structure.

SUMMARY

A semiconductor structure is provided according to one embodiment of the present disclosure. The semiconductor structure includes a bidirectional diffractive grating coupler, where the bidirectional diffractive grating coupler includes a first diffractive grating coupler, a planar waveguide, and a second diffractive grating coupler, a first optical through-silicon via cladding coupled to the first diffractive grating coupler, and a second optical through-silicon via cladding coupled to the first diffractive grating coupler.

A method is provided according to one embodiment of the present disclosure. The method includes forming a first diffractive grating coupler on a first face of a top silicon layer of a first wafer, where the first wafer includes the top silicon layer disposed on a buried oxide layer, and where the buried oxide layer is disposed on a silicon substrate, forming a first optical through-silicon via and a second optical through-silicon via in a device layer and a frontside layer of a second wafer, bonding the first wafer to the second wafer, where the top silicon layer of the first wafer is bonded to the frontside layer of the second wafer, removing the silicon substrate and a portion of the buried oxide layer to expose a second face of the top silicon layer, and forming a second diffractive grating coupler on the second face of the top silicon layer, where the first diffractive grating coupler and the second diffractive grating coupler form a bidirectional diffractive grating coupler.

DETAILED DESCRIPTION

Embodiments of the present disclosure improve upon wafer-level light coupling by providing bidirectional diffractive grating couplers (DGCs) and through-silicon vias (TSVs) that allow for bidirectional light coupling within a semiconductor structure. In one embodiment, a bidirectional DGC includes a first DGC, a planar waveguide, and a second DGC. A first optical TSV cladding and a second optical TSV cladding can be coupled to the first DGC. An optical signal can be transferred between a frontside and a backside of the semiconductor structure via the bidirectional DGC, the first optical TSV cladding, and the second optical TSV cladding.

One benefit of the disclosed embodiments is to provide increased light-coupling features in compact semiconductor structures, which can increase channel density and provide greater flexibility in chip design.

Descriptions of various embodiments of the present disclosure are presented for purposes of illustration, but are not intended to be exhaustive or limited to the embodiments disclosed. Modifications and variations can be made to embodiments of the present disclosure without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
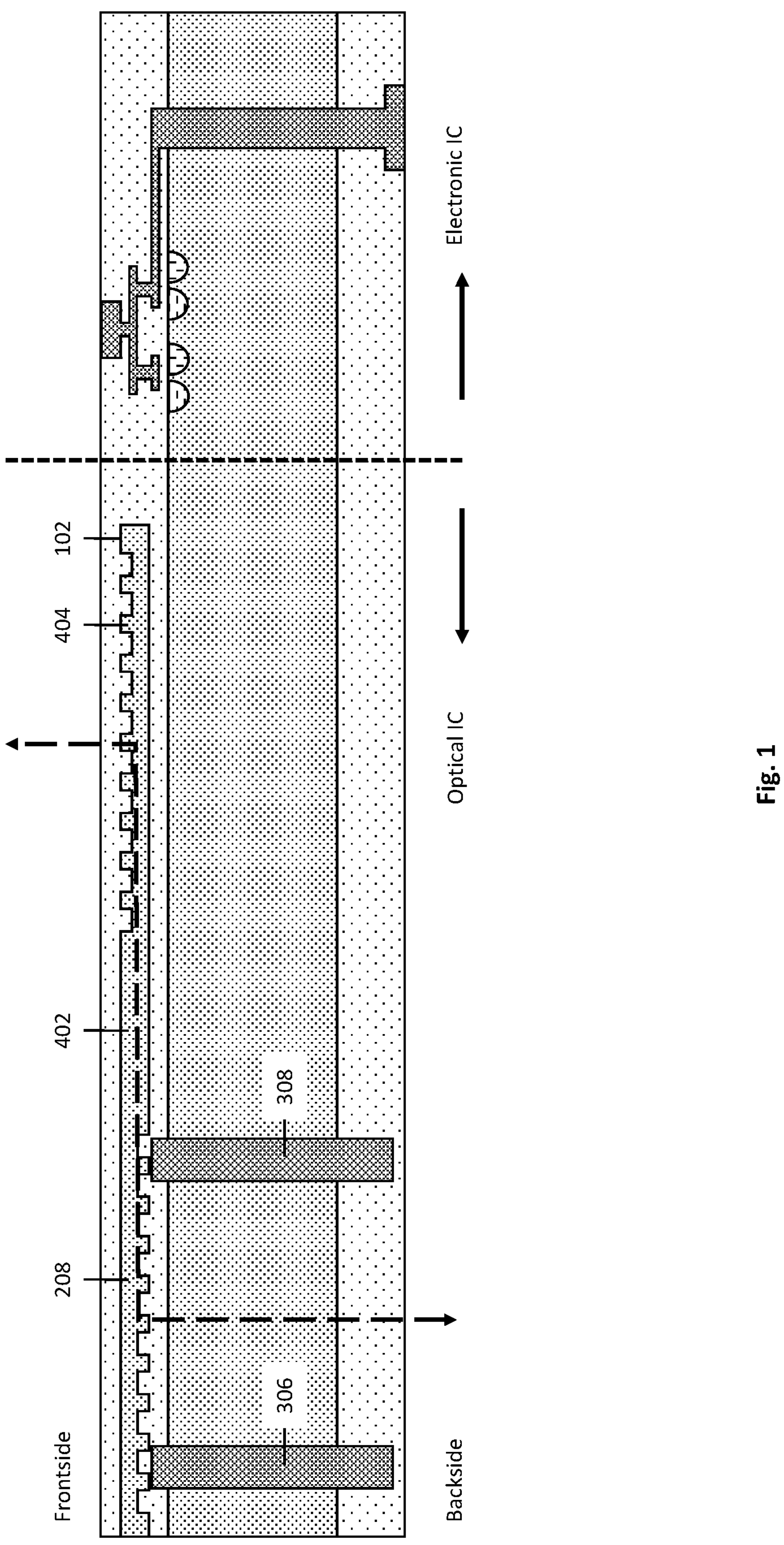
FIG. 1 illustrates a cross-sectional view of a semiconductor structure with bidirectional wafer-level light coupling, according to one embodiment.

FIG. 1 illustrates a cross-sectional view of a semiconductor structure with bidirectional wafer-level light coupling, according to one embodiment. In the illustrated embodiment, the semiconductor structure includes a bidirectional diffractive grating coupler (DGC) 102, a first optical through-silicon via (TSV) cladding 306, and a second optical TSV cladding 308.

In one embodiment, the bidirectional DGC 102 includes a first DGC 208, a planar waveguide 402, and a second DGC 404. The bidirectional DGC 102 can cause light incident on the first DGC 208 or the second DGC 404 to be diffracted in given directions based on a respective grating period, and a wavelength of the light.

In one embodiment, the bidirectional DGC 102 can receive an optical signal at the first DGC 208, transfer the optical signal through the planar waveguide 402, and transfer the optical signal to the second DGC 404. The bidirectional DGC 102 can also receive an optical signal at the second DGC 404, transfer the optical signal through the planar waveguide 402, and transfer the optical signal to the first DGC 208.

The first optical TSV cladding 306 and the second optical TSV cladding 308 can be coupled to the first DGC 208. In this manner, the optical signal can be transferred from a backside of the semiconductor structure, through a medium between the first optical TSV cladding 306 and the second optical TSV cladding 308, through the bidirectional DGC 102, and to a frontside of the semiconductor structure. Further, the optical signal can be transferred from the frontside of the semiconductor structure, through the bidirectional DGC 102, through the medium between the first optical TSV cladding 306 and the second optical TSV cladding 308, and to the backside of the semiconductor structure.

In one embodiment, the first optical TSV cladding 306 and the second optical TSV cladding 308 represent sides of a single optical TSV. For instance, the optical TSV may be a hollow copper tube, the first optical TSV cladding 306 can be a first inner side of the hollow copper tube, and the second optical TSV cladding 308 can be a second inner side of the hollow copper tube that faces opposite the first optical TSV cladding 306. In this instance, the optical signal can traverse an optical path within a core, a medium, or a structural confine of the optical TSV.

In another embodiment, the first optical TSV cladding 306 and the second optical TSV cladding 308 represent separate cladding structures. In this instance, the optical signal can traverse an optical path in a medium between surfaces of the first optical TSV cladding 306 and the second optical TSV cladding 308.

Fabrication processes to form the semiconductor structure of FIG. 1 are described in FIGS. 2-5 below.

Figure 2:
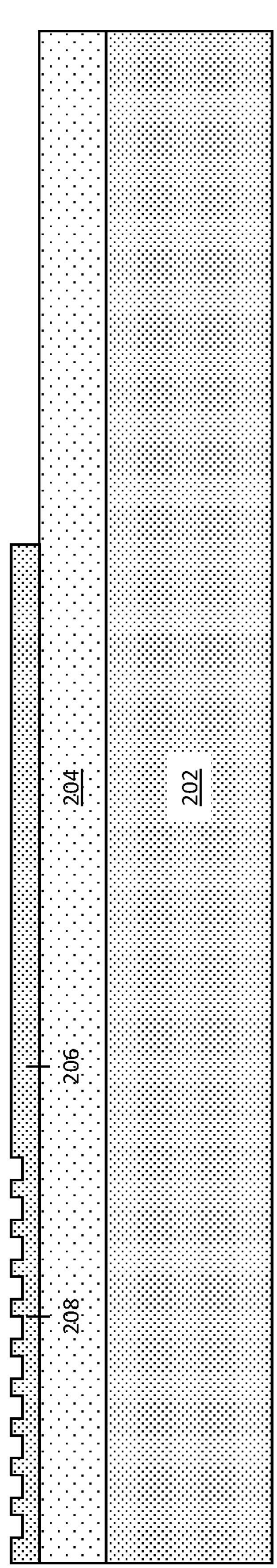
FIG. 2 illustrates a cross-sectional view of a semiconductor structure under fabrication, according to one embodiment.

FIG. 2 illustrates a cross-sectional view of a semiconductor structure under fabrication, according to one embodiment. In the illustrated embodiment, the semiconductor structure includes a first wafer that incorporates a silicon substrate 202, a buried oxide layer 204, and a top silicon layer 206.

The buried oxide layer 204 can be deposited on the silicon substrate 202. In one embodiment, the buried oxide layer 204 includes silicon dioxide ($SiO_2$).

The top silicon layer 206 can be deposited on the buried oxide layer 204. In one embodiment, a photolithography process and an etching process are performed on a first face of the top silicon layer 206 to form a first DGC 208.

Figure 3:
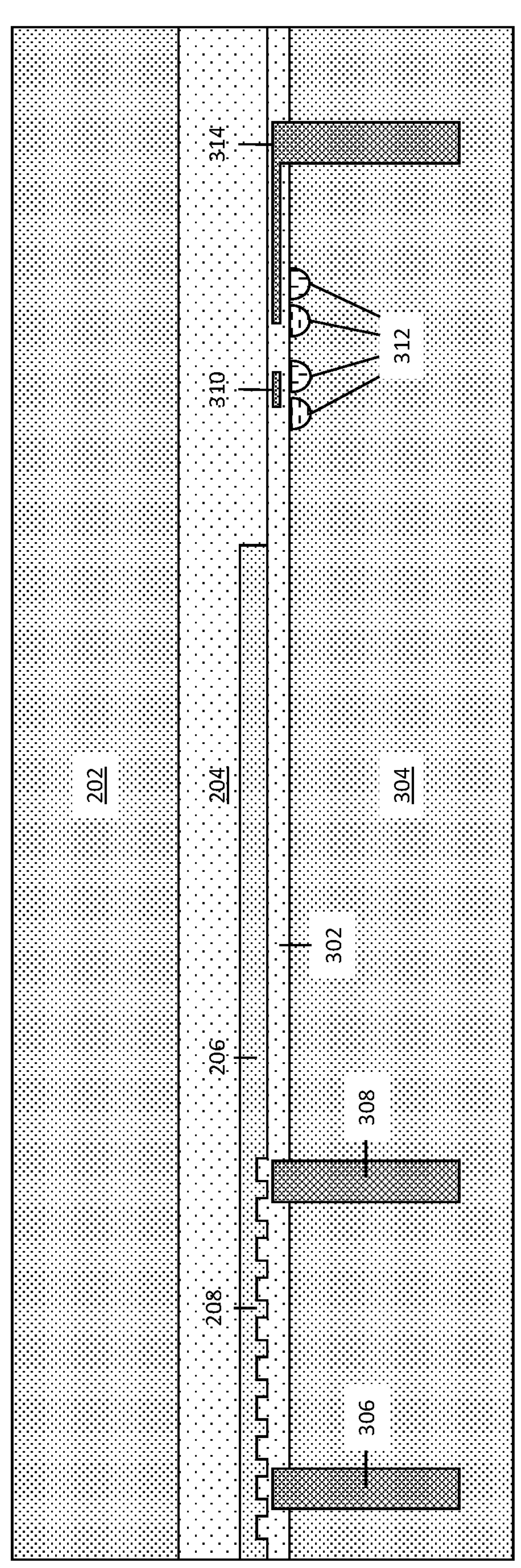
FIG. 3 illustrates a cross-sectional view of a semiconductor structure under fabrication, according to one embodiment.

FIG. 3 illustrates a cross-sectional view of a semiconductor structure under fabrication, according to one embodiment. In the illustrated embodiment, the semiconductor includes a second wafer that incorporates a device layer 304 and a frontside layer 302.

In one embodiment, the device layer 304 includes a device wafer, a chip, chiplets, an interposer, Si, or glass. The frontside layer can include $SiO_2$.

The second wafer can include a first optical TSV cladding 306 and a second optical TSV cladding 308. The first optical TSV cladding 306 and the second optical TSV cladding 308 can be vertical structures that include materials with a lower refractive index than the buried oxide layer 204 and the device layer 304. In one embodiment, a photolithography process and an etching process are performed to form trenches for the first optical TSV cladding 306 and the second optical TSV cladding 308 in the frontside layer 302 and the device layer 304 of the second wafer. Afterwards, silicon, an insulating dielectric (e.g., $SiO_2$), and an internal waveguide material (e.g., silicon nitrate ($Si_3N_4$)), can be deposited into the trenches to form the optical TSVs. Optical signals can traverse layers of the semiconductor structure through a medium (e.g., a portion of the buried oxide layer 204 and a portion of the device layer 304) surrounded by the first optical TSV cladding 306 and the second optical TSV cladding 308.

The second wafer can also include electrical contacts 312 in the device layer 304. In one embodiment, the electrical contacts 312 are coupled to a redistribution layer 310 formed in the frontside layer 302. The redistribution layer 310 can include metal traces that operate to reroute the electrical connections (e.g., the electrical contacts 312) throughout the semiconductor structure.

The second wafer can further include an electrical TSV 314 formed in the frontside layer 302 and the device layer 304. The electrical TSV 314 can provide a vertical path for electrical signals to traverse different layers of the semiconductor structure. In one embodiment, a photolithography process and an etching process are performed to form a trench for the electrical TSV 314. A liner (e.g., tantalum (Ta) or titanium nitride (TiN) can be deposited in the trench to prevent metals from being added to the device layer 304. Afterwards, a conductive material (e.g., Copper (Cu) or Tungsten (W)) can be deposited into the trench to form the electrical TSV 314.

In the illustrated embodiment, a wafer-to-wafer bonding process is performed to bond the first wafer and the second wafer at included $SiO_2$ layers (e.g., the buried oxide layer 204 of the first wafer and the frontside layer 302 of the second wafer). The resultant wafer includes the device layer 304, the frontside layer 302 disposed on the device layer 304, the top silicon layer 206 disposed on the frontside layer 302, the buried oxide layer 204 disposed on the frontside layer 302 and the top silicon layer 206, and the silicon substrate 202 disposed on the buried oxide layer 204.

In one embodiment, the first DGC 208 faces the frontside layer 302. The first optical TSV cladding 306 and the second optical TSV cladding 308 can be coupled to the first DGC 208.

Figure 4:
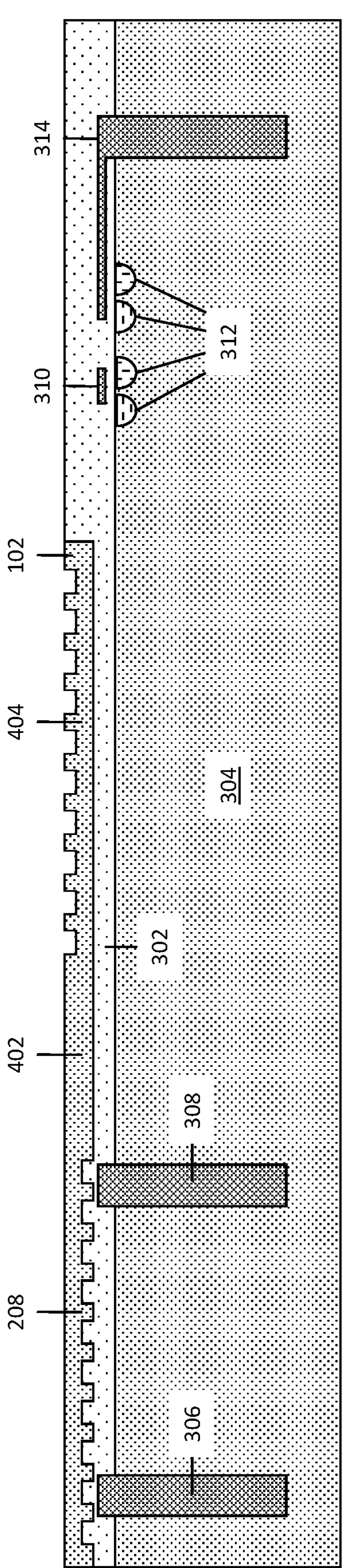
FIG. 4 illustrates a cross-sectional view of a semiconductor structure under fabrication, according to one embodiment.

FIG. 4 illustrates a cross-sectional view of a semiconductor structure under fabrication, according to one embodiment. In the illustrated embodiment, an etching process is performed to remove the silicon substrate 202 and a portion of the buried oxide layer 204, which exposes a second face of the top silicon layer 206.

Afterwards, a photolithography process and an etching process can be performed on the second face of the top silicon layer 206 to form a second DGC 404. In this manner, the bidirectional DGC 102 can include the first DGC 208, a planar waveguide 402, and the second DGC 404. The planar waveguide 402 (e.g., a portion of the top silicon layer 206 that does not include a grating pattern) can be connected to both the first DGC 208 and the second DGC 404.

Figure 5:
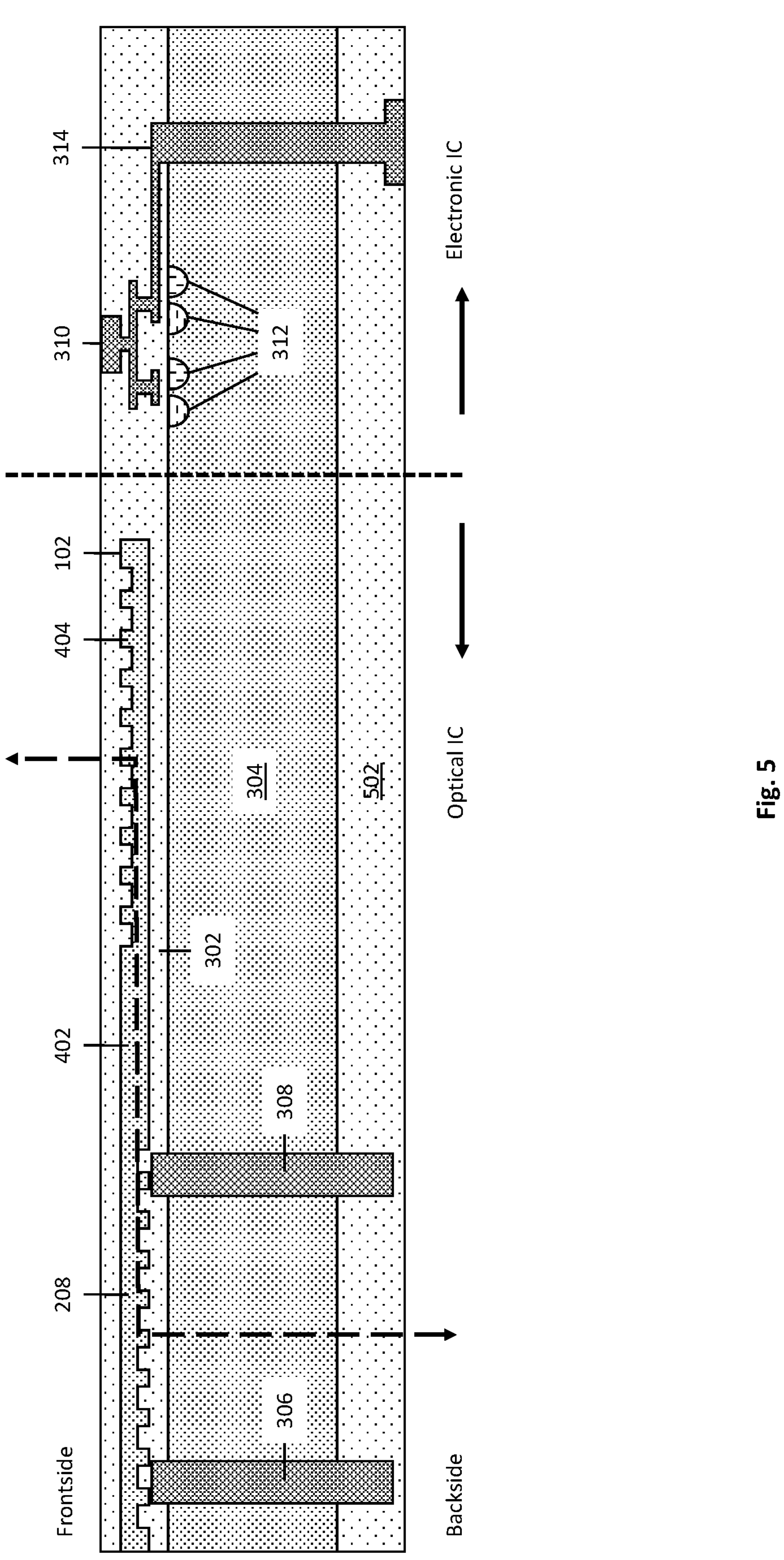
FIG. 5 illustrates a cross-sectional view of a semiconductor structure under fabrication, according to one embodiment.

FIG. 5 illustrates a cross-sectional view of a semiconductor structure under fabrication, according to one embodiment. In the illustrated embodiment, $SiO_2$ can be deposited on the frontside of the semiconductor structure to extend the frontside layer 302.

Further, an etching process or a grinding process can be performed to recess a bottomside of the device layer 304, which exposes the first optical TSV cladding 306, the second optical TSV cladding 308, and the electrical TSV 314 on a backside of the semiconductor structure. Afterwards, a backside layer 502 (which includes $SiO_2$) can be deposited on the bottomside of the device layer 304. In addition, the redistribution layer 310 can be expanded to accommodate more electrical connections and paths through the semiconductor structure.

In the illustrated embodiment, the semiconductor structure includes 3 layers. Layer 1 can include the backside layer 502 (or a grindside layer). Layer 2 can include the device layer 304 disposed on layer 1. Layer 3 can include the frontside layer 302 disposed on layer 2.

In one embodiment, the semiconductor structure includes an optical integrated circuit connected to an electrical integrated circuit. The optical integrated circuit can include the bidirectional DGC 102, the first optical TSV cladding 306, and the second optical TSV cladding 308. The electrical integrated circuit can include the redistribution layer 310, the electrical contacts 312, and the electrical TSV 314.

In one embodiment, the bidirectional DGC 102 (which includes the first DGC 208, the planar waveguide 402, and the second DGC 404) is disposed in the third layer. In another embodiment, the bidirectional DGC 102 is disposed in the first layer. In yet another embodiment, the bidirectional DGC 102 is not physically contiguous (e.g., the first DGC 208 and the second DGC 404 may not be physically connected), and the first DGC 208 and the second DGC 404 are disposed in separate layers (e.g., layers 1 and 3) of the semiconductor structure.

The first optical TSV cladding 306 and the second optical TSV cladding 308 can extend from layer 1 to layer 3. In one embodiment, the first optical TSV cladding 306 and the second optical TSV cladding 308 are coupled to the first DGC 208, such that an optical signal can be transferred between a backside of the semiconductor and a frontside of the semiconductor structure.

In the illustrated embodiment, the dashed bidirectional arrow depicts a general optical path of an optical signal traveling through the semiconductor structure. Optical signals can traverse layers of the semiconductor structure through a medium (e.g., a portion of the frontside layer 302, a portion of the device layer 304, and a portion of the backside layer 502) surrounded by the first optical TSV cladding 306 and the second optical TSV cladding 308.

As previously described, an optical signal can be transferred from a backside of the semiconductor structure, through the medium between the first optical TSV cladding 306 and the second optical TSV cladding 308, through the bidirectional DGC 102, and to a frontside of the semiconductor structure. Further, the optical signal can be transferred from the frontside of the semiconductor structure, through the bidirectional DGC 102, through the medium between the first optical TSV cladding 306 and the second optical TSV cladding 308, and to the backside of the semiconductor structure.

In one embodiment, the redistribution layer 310 is disposed in the third layer, and the electrical contacts 312 are disposed in the second layer. The electrical TSV 314 can extend from the first layer to the third layer. Further, a single mode fiber (not shown) can be coupled to at least one of: the first DGC 208 or the second DGC 404.

Figure 6:
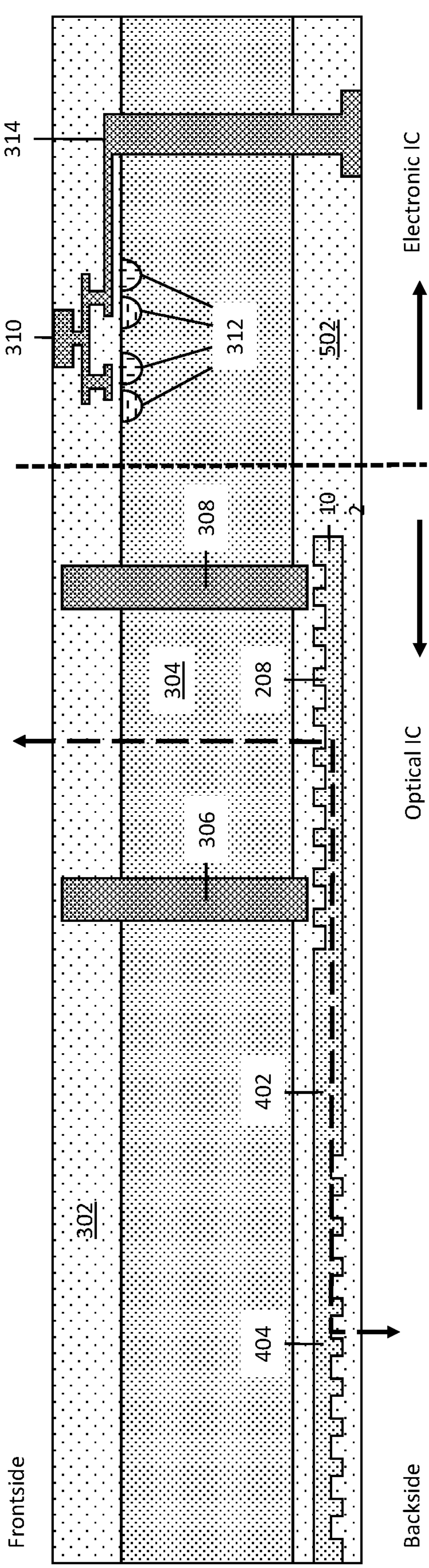
FIG. 6 illustrates a cross-sectional view of a semiconductor structure with bidirectional wafer-level light coupling, according to one embodiment.

FIG. 6 illustrates a cross-sectional view of a semiconductor structure with bidirectional wafer-level light coupling, according to one embodiment. In the illustrated embodiment, the semiconductor structure includes features similar to the features of the semiconductor structure illustrated in FIG. 5. However, in the illustrated embodiment, the bidirectional DGC 102 is disposed in the first layer.

Various embodiments of the present disclosure are described herein with reference to the related drawings. Alternative embodiments can be devised without departing from the scope of this disclosure. Although various connections and positional relationships (e.g., over, below, adjacent, etc.) are set forth between elements in the following description and in the drawings, persons skilled in the art will recognize that some of the positional relationships described herein are orientation-independent when the described functionality is maintained even though the orientation is changed. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

Embodiments of the present disclosure may reference an interlayer dielectric (ILD) material. The ILD material can be an insulating material used to electrically isolate different layers of a semiconductor structure. The ILD material can be $SiO_2$, SiN, a low-k dielectric material, or an ultra-low-k dielectric material. Low-k dielectric materials may generally include dielectric materials having a k value of about 3.9 or less. The ultralow-k dielectric material generally includes dielectric materials having a k value less than 2.5. Unless otherwise noted, all k values mentioned in the present application are measured relative to a vacuum. Ultra-low-k dielectric materials can include porous materials such as porous organic silicate glasses, porous polyamide nanofoams, silica xerogels, porous hydrogen silsequioxane (HSQ), porous methylsilsesquioxane (MSQ), porous inorganic materials, porous CVD materials, porous organic materials, or combinations thereof. The ultra-low-k dielectric material can be produced using a templated process or a sol-gel process. In the templated process, a precursor typically contains a composite of thermally labile and stable materials. After film deposition, the thermally labile materials can be removed by thermal heating, leaving pores in the dielectric film. In the sol gel process, porous low-k dielectric films can be formed by hydrolysis and polycondensation of an alkoxide(s) such as tetraetehoxysilane (TEOS).

Embodiments of the present disclosure may reference p-type or n-type semiconductor structures. "P-type" can refer to the addition of impurities to an intrinsic semiconductor that creates deficiencies of valence electrons. In a silicon-containing substrate, examples of p-type dopants (i.e., impurities) include, but are not limited to, boron, aluminum, gallium, and indium. "N-type" can refer to the addition of impurities that contributes free electrons to an intrinsic semiconductor. In a silicon containing substrate examples of n-type dopants (i.e., impurities) include, but are not limited to, antimony, arsenic and phosphorous.

Various processes used to form a semiconductor structure that will be packaged into an IC fall into four general categories: film deposition, removal/etching, semiconductor doping and patterning/lithography. Deposition is any process that grows, coats, or otherwise transfers a material onto the wafer. Examples of such technologies include physical vapor deposition (PVD), chemical vapor deposition (CVD), plasma enhanced chemical vapor deposition (PECVD), electrochemical deposition (ECD), atomic layer deposition (ALD), epitaxial growth/deposition, or the like. The term "epitaxial growth/deposition" may reference growth of a first semiconductor material on a surface of a second semiconductor material, in which the first semiconductor material has the same crystalline characteristics as the surface of the second semiconductor material. In an epitaxial growth process, chemical reactants provided by source gases are controlled, and system parameters are set so that deposited atoms are disposed on the surface of the second semiconductor material with sufficient energy to traverse the surface and orient to a crystal arrangement of atoms of the surface. Examples of epitaxial growth/deposition process techniques include rapid thermal chemical vapor deposition (RTCVD), low-energy plasma deposition (LEPD), ultra-high vacuum chemical vapor deposition (UHVCVD), atmospheric pressure chemical vapor deposition (APCVD), molecular beam epitaxy (MBE), or the like.

Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., polysilicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, transistors can be built and wired together to form the circuitry of a modern semiconductor device.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation, or the like. Afterwards, the exposed photoresist is developed utilizing a conventional resist development process.

Following the development step, the etching step can be performed to transfer the pattern from the patterned photoresist into the interlayer dielectric. The etching step used in forming the at least one opening can include a dry etching process (e.g., reactive ion etching, ion beam etching, plasma etching, or laser ablation), a wet chemical etching process, or any combination thereof.

While the foregoing is directed to embodiments of the present disclosure, other and further embodiments of the present disclosure may be devised without departing from the basic scope thereof, and the scope thereof is determined by the claims that follow.

The invention claimed is:

1. A semiconductor structure, comprising:

a bidirectional diffractive grating coupler, wherein the bidirectional diffractive grating coupler includes a first diffractive grating coupler, a planar waveguide, and a second diffractive grating coupler;

a first optical through-silicon via cladding coupled to the first diffractive grating coupler; and a second optical through-silicon via cladding coupled to the first diffractive grating coupler, wherein the first diffractive grating coupler and the second diffractive grating coupler are connected to opposite ends of the planar waveguide, wherein the first diffractive grating coupler comprises u-shaped grooves facing downward, and wherein the second diffractive grating coupler comprises u-shaped grooves facing upward.

2. The semiconductor structure of claim 1, further comprising:

a single mode fiber coupled to at least one of: the first diffractive grating coupler or the second diffractive grating coupler;

wherein the first diffractive grating coupler, the second diffractive grating coupler, and the planar waveguide are disposed within in a monolithic oxide layer;

wherein a backside of the first diffractive grating coupler is void of the u-shaped grooves facing downward such that the backside of the first diffractive grating coupler is continuous with a side of the planar waveguide; and wherein a backside of the second diffractive grating coupler is void of the u-shaped grooves facing upward such that the backside of the second diffractive grating coupler is continuous with an opposite side of the planar waveguide.

3. The semiconductor structure of claim 1, wherein the semiconductor structure includes:

a first layer that includes a backside layer;

a second layer comprising a device layer, wherein the second layer is disposed on the first layer; and a third layer comprising a frontside layer, wherein the third layer is disposed on the second layer.

4. The semiconductor structure of claim 3, wherein the first layer includes $SiO_2$;

wherein the second layer includes a device wafer, a chip, chiplets, an interposer, Si, or glass; and wherein the third layer includes $SiO_2$.

5. The semiconductor structure of claim 3, wherein the first optical through-silicon via cladding extends from the first layer to the third layer;

wherein the second optical through-silicon via cladding extends from the first layer to the third layer; and wherein an optical signal travels through a medium surrounded by the first optical through-silicon via cladding and the second optical through-silicon via cladding, wherein the medium includes a portion of the first layer, a portion of the second layer, and a portion of the third layer.

6. The semiconductor structure of claim 3, wherein the bidirectional diffractive grating coupler is disposed in one of: the first layer or the third layer, and wherein the bidirectional diffractive grating coupler includes one of: the first diffractive grating coupler and the second diffractive grating coupler disposed in a same layer of the semiconductor structure, or the first diffractive grating coupler and the second diffractive grating coupler disposed in different layers of the semiconductor structure.

7. The semiconductor structure of claim 3, wherein the semiconductor structure includes an optical integrated circuit, wherein the optical integrated circuit includes the bidirectional diffractive grating coupler, the first optical through-silicon via cladding, and the second optical through-silicon via cladding.

8. The semiconductor structure of claim 7, wherein the semiconductor structure includes an electrical integrated circuit connected to the optical integrated circuit, wherein the electrical integrated circuit includes a redistribution layer, electrical contacts, and an electrical through-silicon via.

9. The semiconductor structure of claim 8, wherein the redistribution layer is disposed in the third layer, and wherein the electrical contacts are disposed in the second layer.

10. The semiconductor structure of claim 9, wherein the electrical through-silicon via extends from the first layer to the third layer.

11. A method comprising:

forming a first diffractive grating coupler on a first face of a top silicon layer of a first wafer, wherein the first wafer includes the top silicon layer disposed on a buried oxide layer, and wherein the buried oxide layer is disposed on a silicon substrate;

forming a first optical through-silicon via cladding and a second optical through-silicon via cladding in a device layer and a frontside layer of a second wafer;

bonding the first wafer to the second wafer, wherein the top silicon layer of the first wafer is bonded to the frontside layer of the second wafer;

removing the silicon substrate and a portion of the buried oxide layer to expose a second face of the top silicon layer; and forming a second diffractive grating coupler on the second face of the top silicon layer, wherein the first diffractive grating coupler and the second diffractive grating coupler form a bidirectional diffractive grating coupler, wherein the first diffractive grating coupler and the second diffractive grating coupler are connected to opposite ends of the planar waveguide, wherein the first diffractive grating coupler comprises u-shaped grooves facing downward, and wherein the second diffractive grating coupler comprises u-shaped grooves facing upward.

12. The method of claim 11, wherein the first optical through-silicon via cladding and the second optical through-silicon via cladding are coupled to the first diffractive grating coupler.

13. The method of claim 11, wherein the frontside layer is disposed on the device layer of the second wafer.

14. The method of claim 11, wherein a redistribution layer is formed in the frontside layer, wherein the redistribution layer is coupled to electrical contacts, and wherein the electrical contacts are disposed in the device layer of the second wafer.

15. The method of claim 14, wherein the redistribution layer is connected to an electrical through-silicon via.

16. The method of claim 11, further comprising:

depositing silicon dioxide on the bidirectional diffractive grating coupler and the frontside layer.

17. The method of claim 11, further comprising:

removing a portion of the device layer; and depositing silicon dioxide on a backside of the second wafer to form a backside layer of the second wafer.

18. The method of claim 17, wherein the first optical through-silicon via cladding, the second optical through-silicon via cladding, and an electrical through-silicon via extend from the backside layer to the frontside layer.

19. The method of claim 17, further comprising:

transferring an optical signal between the frontside layer and the backside layer through a medium surrounded by the first optical through-silicon via cladding and the second optical through-silicon via cladding, wherein the medium includes a portion of the frontside layer, a portion of the device layer, and a portion of the backside layer.

20. The method of claim 17, wherein the first optical through-silicon via cladding and the second optical through-silicon via cladding represent one of: sides of a single optical TSV, or separate cladding structures.

* * * * *